United States Patent Office 3,096,201
Patented July 2, 1963

3,096,201
INSOLUBILISATION OF FURTHER-POLYMERIS-ABLE METHYLOL-PHOSPHORUS POLYMERIC MATERIALS
Harold Coates, Wombourn, and Brian Chalkley, Stourbridge, England, assignors to Albright & Wilson Limited, Warwickshire, England, a company of the United Kingdom
No Drawing. Filed Oct. 14, 1960, Ser. No. 62,557
Claims priority, application Great Britain May 30, 1960
15 Claims. (Cl. 117—62.2)

This invention is an improvement in or modification of the inventions claimed in U.S. Patent No. 2,772,188 and in the specification of our copending U.S. patent application Serial No. 856,380, now U.S. Patent No. 2,983,623. These patents describe processes of increasing the extent of polymerisation and insolubility of further-polymerisable methylol-phosphorus polymeric materials, by reacting the further-polymerisable polymer with ammonia or with gaseous ammonia followed by aqueous ammonia. The nature of the further-polymerisable compounds to be treated is defined in said specifications, and the process of the present invention is applicable with the use of the further-polymerisable compounds as defined.

U. S. Patent No. 2,772,188 describes a process of increasing the extent of polymerisation and insolubility of a further-polymerisable methylol-phosphorus polymeric material, by reacting the further-polymerisable polymer with ammonia. The reaction which takes place according to U.S. Patent No. 2,772,188 is in the nature of a cross-linking reaction whereby there is obtained a substance of high molecular weight and insoluble in water. The reaction may be illustrated as follows:

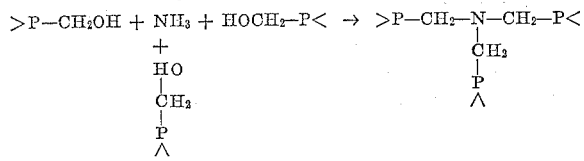

As the polymeric material increases in molecular weight it will become increasingly difficult to react each phosphorus-methylol group trifunctionally with ammonia in the manner shown above and thus in the final product there may be bifunctional and also monofunctional linkages, e.g. >P—CH₂—NH—CH₂—P< and

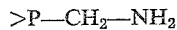

(the ammonia usually being present in excess). When the reaction is effected in or upon cellulosic textile materials in order to impart flame resistance properties it is undesirable that there should be present such bifunctional and monofunctional linkages to any substantial extent because this would result in reduced wash-fastness of the treated textile material.

In the specification of U.S. Patent No. 2,983,623, it is stated that the ammonia may be employed in the form of gaseous ammonia, ammonium hydroxide, a solution of ammonia in an inert solvent, or as ammonia released in situ by the reaction of a compound capable of releasing ammonia, e.g. an ammonium salt of a weak acid, such as ammonium acetate, or ammonium carbonate.

The textile material after having been impregnated with an aqueous solution or dispersion of the further-polymerisable methylol-phosphorus compound is dried and then treated with the ammonia, or ammonium carbonate solution.

When treating the impregnated and dried textile material with gaseous ammonia the rate of reaction is very slow as it is necessary for the ammonia to diffuse completely throughout the textile material structure in order to react completely with the methylol-phosphorus polymeric material. It is possible to obtain a fully reacted product by this means but it is usually necessary to suspend the textile material in the ammonia atmosphere for at least ten minutes at room temperature and a longer time is beneficial. Higher temperatures and pressures may also be used.

When treating the impregnated and dried textile material with ammonium hydroxide or ammonium carbonate solution there is a tendency for the partially-polymerized compound to migrate to the surface of the textile material before having reacted with the ammonia to an extent sufficient to render the resin material immobile. This is especially the case if the drying of the padded textile material has not been satisfactorily carried out. On the other hand, using an aqueous ammonia system the cross-linking is very rapid and is complete in a few minutes at room temperature. Also, being a liquid system the ammonia thoroughly penetrates the whole fibre system leaving no uncured areas, and by moving the textile material through the aqueous system uniformity of ammonia concentration is ensured.

It will be seen from the above that there are certain disadvantages appertaining to both the gaseous ammonia treatment and the aqueous ammonia treatment.

U.S. Patent No. 2,983,623 describes a process which takes advantage of both the aqueous and gaseous systems and thereby obtains the benefits of each and eliminates many of the disadvantages. This is done, according to the invention of U.S. Patent No. 2,983,623, by giving the impregnated and dried textile material an initial treatment by subjecting it to the action of gaseous ammonia and following this by subjecting the textile material to an aqueous ammonia treatment. The gaseous treatment provides an initial reaction between the ammonia and the methylol-phosphorus material sufficient to render the final resin material substantially immobile in the textile fibres. The subsequent aqueous ammonia treatment ensures complete penetration of the whole fibre system by ammonia and hence leaves no uncured or partly cured areas. The process is therefore carried out by impregnating a cellulosic material with an aqueous solution of a further-polymerisable methylol-phosphorus polymeric material as defined, drying the treated cellulosic material, subjecting such treated and dried material to gaseous ammonia and treating said materials with an aqueous ammonia system.

In U.S. Patent No. 2,983,623, is is shown to be advantageous to buffer the further-polymerisable polymer solution by means of sodium acetate or ammonium acetate or other ammonium salts of weak acids. It is stated that the advantage of using ammonium acetate or other ammonium salts of weak acids is that partial cross-linking takes place during the final stage of the drying operation thereby decreasing the tendency of the phosphorus material to migrate to the surface of the textile during the subsequent processing.

We have now found that by adding a substantial amount of diammonium sulphite or a mixture of an ammonium salt of another weak acid together with a sulphite to the further-polymerisable polymer solution, the partial gaseous ammonia treatment, according to the process of U.S. Patent No. 2,983,623, becomes unnecessary. The present invention therefore provides a much more convenient and economic process since it can be carried out on a continuous basis on conventional textile processing equipment. The parent acid from which the ammonium salt is derived must not be too weak otherwise there will be sufficient dissociation at room temperature to give a cross-linking reaction thus leading to instability of the further-polymerisable polymer solution. The further-polymerisable polymer solution may also advantageously contain a buffer compound such as sodium bicarbonate. The amount of ammonium salt to be added must be sufficient to bring about an appreciable degree of reaction by dissociation of the ammonium salt and release of ammonia in situ during the drying operation of the process. We have found that a suitable amount of ammonium salt is from 2–15 parts per 100 parts of further-polymerisable polymer. It is to be understood, however, that the actual amount of ammonium salt used in any particular case need not necessarily come within this range as it will depend on (1) the particular T.H.P. salt which is employed in the preparation of the further-polymerisable phosphorus-methylol polymer solution, (2) the presence or absence of a buffer compound in the solution and (3) the nature of the buffer compound if present.

A simplified flow diagram of the process is as follows:

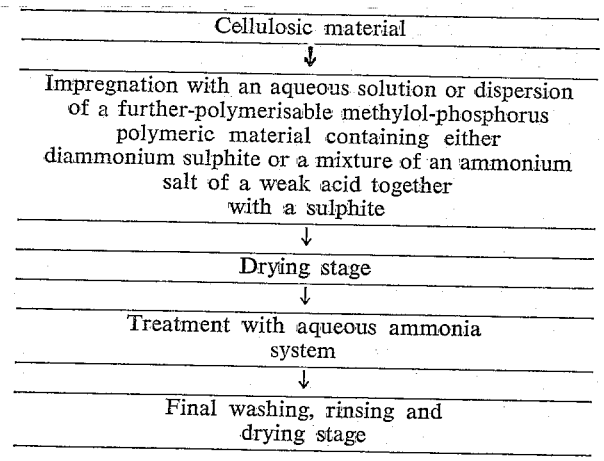

Accordingly, the present invention provides a process for increasing the extent of polymerisation and insolubility of a further-polymerisable methylol-phosphorus polymeric material as hereinbefore defined which comprises heating, preferably at a temperature of from 85 to 120° C., a solution of the polymeric material and either diammonium sulphite or a mixture of an ammonium salt of a weak acid together with a sulphite, and heating the resulting product with an aqueous ammonia system or alternatively steaming the product in the presence of ammonia gas.

The most important application of the present invention is in the treatment of cellulosic material and, in this case, the process comprises the following steps:

(1) Impregnating a cellulosic material with a solution of a further-polymerisable methylol-phosphorus material as hereinbefore defined containing either diammonium sulphite or a mixture of an ammonium salt of a weak acid together with a sulphite, (2) Drying the treated cellulosic material by the action of heat preferably at temperatures from 85–120° C., and (3) Treating the said material with an aqueous ammonia system or alternatively steaming the material in the presence of ammonia gas.

According to the process of the invention the solution of further-polymerisable methylol-phosphorus material may also contain a buffer compound. The aqueous ammonia system used may be aqueous ammonia itself, ammonium carbonate solution or ammonium carbamate solution.

Whereas any of the further-polymerisable methylol-phosphorus compounds referred to in the parent U.S. Patent No. 2,772,188 are satisfactory for the process of the present invention, particularly suitable compounds are the reaction products of a tetrakis hydroxy-methyl phosphonium salt, such as tetrakis hydroxy-methyl phosphonium chloride (THPC) with urea or urea and melamine or urea and guanidine. Such condensates are stable in storage and may be diluted quite considerably without affecting their utility. The proportions of melamine and guanidine may be varied widely.

In general, the THPC-urea precondensates are prepared as described in U.S. Patent No. 2,983,623. The THPC-urea-guanidine precondensates and THPC-urea-melamine precondensates are prepared by refluxing a mixture of THPC, urea and guanidine or melamine in water for about an hour and then cooling rapidly. The diammonium sulphite and buffering salt (if required) are then added, as solids or in solution as appropriate, with continuous stirring, to the precondensate. Alternatively, the ammonium salt of another weak acid mixed with a sulphite is added to the precondensate. In this case also a buffer compound may be added if required. The fabric is impregnated with this solution, squeezed and then dried, suitably at a temperature from 85–120° C., although this can be varied widely, depending on the time and process conditions under which the wet cloth is subjected to the drying operation. The dried fabric is then immersed in aqueous ammonia, ammonium carbonate solution or ammonium carbamate solution for about 10 minutes. On removal from this solution the fabric, without rinsing, is washed, suitably in a solution of soap or detergent and hydrogen peroxide in water, then finally rinsed in hot water, squeezed to remove excess water and dried, suitably at about 120° C. Instead of immersing the impregnated dried fabric in aqueous ammonia it may be steamed in an atmosphere of steam containing ammonia gas.

Cellulosic textiles according to the invention have modified properties. Thus the deposited polymer according to the amount applied may act as a filler or it may modify the dyeing properties or the lustre or appearance and in particular it will improve the flame-resistant properties of the textile. Also, the textile may acquire increased resistance to degradation by rotting.

The following examples serve to illustrate the invention, the parts mentioned being by weight.

*Example 1*

A THPC-urea precondensate was prepared exactly as described in Example 1 of U.S. Patent No. 2,983,623. To this precondensate was added 10 parts of ammonium sulphite monohydrate per 100 parts precondensate with continuous stirring. A scoured and bleached 6 oz. per square yard cotton drill fabric was impregnated with this solution in a laboratory padding mangle to a pick-up of 70–80 parts of solution per 100 parts dry fabric. The impregnated fabric was dried at 85–89° C. for 10 minutes and then treated in a solution of 10 parts ammonia (S.G. 0.91) in 60 parts cold water for 10 minutes. The fabric was removed from this solution and, without rinsing was washed in a solution of 5 parts soap and 2 parts commercial 100 vol. strength hydrogen peroxide in 1000 parts water for 10 minutes at 40–50° C., then 10 minutes at 90–95° C. before finally being rinsed in hot water, squeezed to remove excess water and dried at 120° C. The dried fabric which showed an increase in weight of 16.2% due to the treatment had excellent resistance to burning when tested by the method described under B.S.S. 3119, 1959. This flame resistant property was not impaired after subjecting the treated fabric to 5 successive 1 hr. boiling washes in a solution containing 2.5 parts soap and 2.5 parts anhydrous sodium carbonate per 1000 parts water.

*Example 2*

A THPC-urea precondensate was prepared exactly as described in Example 1 of U.S. Patent No. 2,983,623. To this precondensate was added 6 parts anhydrous sodium bicarbonate or sodium acetate and 4.2 parts ammonium sulphite monohydrate per 100 parts precondensate with continuous stirring. A scoured and bleached 6 oz. per square yard cotton 2 x 2 drill fabric was impregnated with this solution and squeezed to retain 75 parts solution per 100 parts of dry fabric. The impregnated fabric was dried at 85–95° C. for 7 minutes, and then immersed in a solution of 10 parts ammonia (S.G. 0.880) in 60 parts cold water for 10 minutes. The fabric was removed from this solution and, without rinsing, was washed, dried and rinsed as described in Example 1. The dried fabric which showed an increase in weight of 16–20% compared to the original fabric had excellent flame resistance when treated by a vertical strip flame test such as described in B.S.S. 3119, 1959. This property was not impaired after subjecting the fabric to 5 successive 1 hr. boiling washes in a solution of 2.5 parts soap and 2.5 parts anhydrous sodium carbonate per 1000 parts water.

Example 3

A THPC-urea precondensate was prepared exactly as described in Example 1 of U.S. Patent No. 2,983,623. To this precondensate was added 1 part anhydrous sodium bicarbonate or sodium acetate and 8 parts ammonium sulphite monohydrate per 100 parts precondensate with continuous stirring. Absorbent cotton wool was impregnated with this solution and squeezed to retain 100 parts of solution per 100 parts dry cotton. The impregnated cotton wool was dried at 85–95° C. for 10 minutes and then treated in a solution of 10 parts ammonia (S.G. 0.880) in 60 parts cold water for 10 minutes. The cotton was removed from this solution and, without rinsing, washed in a solution of 5 parts soap and 2 parts commercial 100 volume hydrogen peroxide in 1000 parts water for 10 minutes at 45–50° C. before finally being rinsed in hot water, squeezed to remove excess water and dried in hot air at 105° C. The dried material which showed an increase in weight of 18% compared with the original cotton had good resistance to burning when a lighted match was applied to the material.

Example 4

A THPC-urea-guanidine precondensate was prepared by refluxing a solution of 3150 parts THPC, 770 parts guanidine carbonate and 370 parts urea in 4000 parts water for 1 hr. and then cooling rapidly. To this precondensate was added 4.2 g. ammonium sulphite monohydrate per 100 parts of this precondensate with continuous stirring. A scoured and bleached 6 oz. per square yard cotton 2 x 2 drill fabric was impregnated with this solution and squeezed to retain 70–80 parts of solution per 100 parts of dry fabric. The impregnated fabric was dried at 85–95° C. for 10 minutes and then immersed in a solution of 10 parts ammonia (S.G. 0.880) in 60 parts cold water for 10 minutes. The fabric was removed from this solution, and without rinsing, was washed, dried and rinsed as described in Example 1. The dried fabric which showed an increase in weight of 16–20% compared to the original fabric had good flame resistant properties when subjected to the test specified in B.S.S. 3119, 1959.

Example 5

A sample of cotton wool treated as in Example 3 and a sample of similar untreated cotton wool were immersed in a solution of 5 parts Kiton Fast Red G (Ciba Ltd.), and 5 parts of anhydrous sodium sulphate in 1000 parts of water at 90–95° C. for 1 hour with a cotton to liquor ratio of 1:40. After removing the two samples and rinsing in cold water for 20 minutes the treated sample was dyed to a much greater depth of shade than the untreated sample. Further the dyeing on the treated cotton was more resistant to hot soaping than the dyeing on the untreated sample.

Example 6

A THPC-urea precondensate was prepared as described in Example 1 of U.S. Patent No. 2,983,623. To this precondensate was added 5 parts ammonium acetate and 5 parts potassium sulphite per 100 parts precondensate. A scoured and bleached 6 oz. per square yard cotton fabric was impregnated with this solution and squeezed to retain 70 parts solution per 100 parts of dry fabric. The impregnated fabric was dried at 90° C. for 10 minutes and then treated in a solution of 10 parts ammonia (S.G. 0.880) in 60 parts cold water for 10 minutes. The fabric was removed from this solution, and without rinsing, washed, dried and rinsed as described in Example 1. The dried fabric which showed an increase in weight of 18.5% compared to the original fabric had excellent resistance to burning when tested by a vertical strip flame test such as described in B.S.S. 3119, 1959. This property was not impaired after the fabric had been subjected to 5 successive 1 hr. boiling washes in a solution of 2.5 parts soap and 2.5 parts anhydrous sodium carbonate in 1000 parts water.

Example 7

A THPC-urea precondensate was prepared as described in Example 1 of U.S. Patent No. 2,983,623. To this precondensate was added 5 parts ammonium acetate and 4 parts anhydrous sodium sulphite per 100 parts precondensate with continuous stirring. A scoured and bleached 6 oz. per square yard cotton 2 x 2 drill fabric was impregnated with this solution in a laboratory padding mangle to a pick-up of 70 parts of solution per 100 parts dry fabric. The impregnated fabric was dried at 90° C. for 10 minutes and then treated in a solution of 10 parts ammonia (S.G. 0.880) in 60 parts cold water for 10 minutes. The fabric was removed from this solution and, without rinsing, washed, dried and rinsed as described in Example 1. The dried fabric showed an increase in weight of 18.3% and had excellent resistance to burning when tested by the method described in B.S.S. 3119, 1959. The flame resistant property was not impaired after subjecting the treated fabric to 5 successive 1 hr. boiling washes in a solution containing 2.5 parts soap and 2.5 parts anhydrous sodium carbonate per 1000 parts water.

Example 8

A THPC-urea precondensate was prepared as described in Example 1 of U.S. Patent No. 2,983,623. To this precondensate was added 5 parts ammonium acetate and 4 parts anhydrous sodium sulphite per 100 parts of precondensate with continuous stirring. A scoured and bleached 6 oz. per square yard cotton drill fabric was impregnated with this solution in a laboratory padding mangle to a pick-up of 70–80 parts of solution per 100 parts dry fabric. The impregnated fabric was dried at 85–95° C. for 10 minutes and then treated for 10 minutes in a solution containing 10 parts ammonium carbonate in 90 parts cold water. The fabric was removed from this solution and, without rinsing, washed, dried and rinsed as described in Example 1. The dried fabric which showed an increase in weight of 18.0% compared to the untreated fabric, had excellent resistance to burning when tested by the method described in B.S.S. 3119, 1959. This flame resistant property was not impaired after subjecting the fabric to 5 successive 1 hr. boiling washes in a solution of 2.5 parts soap and 2.5 parts anhydrous sodium carbonate in 1000 parts water.

Example 9

A THPC-urea-melamine precondensate was prepared by refluxing a mixture of 3150 parts THPC, 500 parts urea, 125 parts melamine and 4000 parts of water with stirring for 1 hr. and then cooling rapidly. To this precondensate was added 1 part anhydrous sodium bicarbonate and 4.2 parts ammonium sulphite monohydrate per 100 parts of precondensate with continual stirring. A scoured and bleached 6 oz. per square yard cotton drill fabric was impregnated with this solution and squeezed to retain 79 parts of solution per 100 parts of dry fabric. The impregnated fabric was dried at 85–90° C. for 10 minutes and then immersed in a solution of 10 parts ammonia (S.G. 0.880) in 60 parts cold water for 10 minutes.

The fabric was removed from this solution and, without rinsing, washed, dried and rinsed as described in Example 1. The dried fabric which showed an increase in weight of 19.0% compared to the original fabric, had excellent resistance to burning when tested by a vertical strip flame test such as described in B.S.S. 3119, 1959. This property was not impaired after subjecting the fabric to 5 successive 1 hr. boiling washes in a solution containing 2.5 parts soap and 2.5 parts anhydrous sodium carbonate per 1000 parts water, the fabric to liquor ratio used being 1:40.

*Example 10*

A THPC-urea-melamine precondensate was prepared by refluxing a mixture of 3150 parts THPC, 500 parts urea, 25 parts melamine and 4000 parts of water with stirring for 1 hr. and then cooling rapidly. To this precondensate was added 2 parts anhydrous sodium bicarbonate and 2.1 parts ammonium sulphite monohydrate per 100 parts of precondensate. During addition of these compounds the precondensate was stirred continuously. A scoured and bleached 6 oz. per square yard cotton drill fabric was impregnated with this solution in a laboratory padding mangle to a pick-up of 79.1 parts of solution per 100 parts dry fabric. The impregnated fabric was dried at 85–95° C. for 10 minutes and then treated for 10 minutes in a solution containing 10 parts ammonium carbonate in 90 parts cold water. The fabric was removed from this solution and, without rinsing, washed, dried and rinsed as described in Example 1. The dried fabric which showed an increase in weight of 19.8% compared to the untreated fabric, had excellent resistance to burning when tested by the method described under B.S.S. 3119, 1959. This flame resistant property was not impaired after subjecting the fabric to 5 successive 1 hr. boiling washes in a solution of 2.5 parts soap and 2.5 parts anhydrous sodium carbonate in 1000 parts water.

*Example 11*

A THPC-urea precondensate was prepared as described in Example 1 of U.S. Patent No. 2,983,623. To this precondensate was added 6 parts sodium bicarbonate and 4.2 parts ammonium sulphite monohydrate per 100 parts of precondensate with continuous stirring. A scoured and bleached 6 oz. per square yard cotton drill fabric was impregnated with this solution and squeezed to retain 80 parts solution per 100 parts of dry fabric. The impregnated fabric was dried at 85–95° C. for 10 minutes and then treated for 10 minutes in a solution containing 10 parts ammonium carbonate in 90 parts cold water. The fabric was removed from this solution, and without rinsing, washed, dried and rinsed as described in Example 1. The dried fabric which showed an increase in weight of 18.2% compared to the original fabric, had excellent resistance to burning when tested by a vertical strip flame test such as described in B.S.S. 3119, 1959. This property was not impaired after subjecting the fabric to 5 successive 1 hr. boiling washes in a solution of 2.5 parts soap and 2.5 parts anhydrous sodium carbonate in 1000 parts water. The same results were obtained when 6 parts sodium acetate were used instead of the sodium bicarbonate.

*Example 12*

A THPC-urea precondensate was prepared exactly as described in Example 1. To this precondensate was added 10 parts of ammonium sulphite per 100 parts precondensate with continuous stirring. A sample of 1009 quality 5 oz. per square yard spun viscose plain weave fabric was impregnated with this solution to a pick-up of 105 parts of solution per 100 parts dry fabric. The impregnated fabric was dried at 85–89° C. for 10 minutes and then treated in a solution of 10 parts ammonia (S.G. 0.880) in 50 parts cold water. The cloth was then washed off and dried as described in Example 1. The dried fabric showed an increase in weight of 21%, was flame-resistant and was delustred. These properties were not impaired after subjecting the treated fabric to 5 successive 1 hr. boiling washes in a solution containing 2.5 parts soap and 2.5 parts anhydrous sodium carbonate per 1000 parts water.

*Example 13*

A THPC-urea precondensate was prepared exactly as described in Example 1 of U.S. Patent No. 2,983,623. To this precondensate was added 6 parts sodium bicarbonate and 4.0 parts ammonium sulphite monohydrate per 100 parts precondensate with continuous stirring. Absorbent cotton wool was impregnated with this solution and squeezed to retain 100 parts of solution per 100 parts dry cotton. The impregnated material was dried at 85–95° C. and then immersed in a solution of 10 parts ammonium carbamate in 90 parts cold water for 10 minutes. The material was removed from this solution, and without rinsing, washed in a solution containing 5 parts soap and 2 parts commercial 100 volume hydrogen peroxide in 1000 parts water for 10 minutes at 30–40° C. before finally being rinsed in hot water, squeezed to remove excess water and dried in hot air at 105° C. The dried material which showed an increase in weight of 18.4% compared to the original cotton had good resistance to burning when subject to the naked flame of a match.

*Example 14*

A THPC-urea-melamine precondensate was prepared by refluxing a mixture of 3150 parts THPC, 500 parts urea, 125 parts melamine and 4000 parts of water with stirring for 1 hr. and then cooling rapidly. To this precondensate was added 1 part anhydrous sodium bicarbonate and 4.2 parts ammonium sulphite monohydrate per 100 parts of precondensate with continual stirring. A scoured and bleached 6 oz. per square yard cotton drill fabric was impregnated with this solution and squeezed to retain 79 parts of solution per 100 parts of dry fabric. The impregnated fabric was dried at 85–90° C. for 10 minutes and then immersed in a solution of 10 parts ammonia (S.G. 0.880) in 60 parts cold water for 10 minutes. The fabric was removed from this solution and, without rinsing, washed, dried and rinsed as described in Example 1. The dried fabric showed an increase in weight of 19.0% compared to the original fabric. Samples of the treated and untreated fabric were stretched onto small wooden frames and buried side by side in a garden compost heap. After one month the samples were removed from the heap and the untreated fabric was considerably degraded and in holes. The treated fabric was quite intact and remained so after burial for a further 2 months.

*Example 15*

A THPC-urea precondensate was prepared exactly as described in Example 1 of U.S. Patent No. 2,983,623. To this precondensate was added 5 parts sodium bicarbonate and 4.0 parts ammonium sulphite monohydrate per 100 parts precondensate with continuous stirring. A sample of Whatman's No. 20 filter paper was impregnated with this solution and squeezed to retain 200 parts solution per 100 parts of dry paper. The paper was dried at 85–95° C. and then treated in a solution containing 10 parts ammonia (S.G. 0.880) in 60 parts cold water for 10 minutes. The paper was removed from this solution and immediately immersed in a solution containing 6 parts commercial 100 volume hydrogen peroxide in 1400 parts cold water for 15 minutes. The paper was then removed from this solution and hot air dried at 85–95° C. The paper, which showed an increase in weight of 30–34% compared to the original sample had excellent resistance to burning.

*Example 16*

A THPC-urea precondensate was prepared exactly as described previously in Example 1 of U.S. Patent No. 2,983,623. To this precondensate was added 1 part anhydrous sodium acetate and 10 parts sodium sulphite monohydrate per 100 parts precondensate with continuous stirring. Whatman filter paper No. 20 was impregnated with this solution and squeezed to retain 180 parts solution per 100 parts dry paper. The impregnated paper was dried at 85–95° C. for 10 minutes and then treated in a solution containing 10 parts ammonium carbamate in 90 parts cold water for 10 minutes. The paper was removed from this solution and, without rinsing, immersed in a solution of 5 parts soap and 2 parts commercial 100 volume hydrogen peroxide in 1000 parts water for 15 minutes before being finally rinsed in hot and cold water, squeezed to remove excess water and finally dried at 105° C. The dried paper which showed an increase in weight of 28–30% compared to the original paper had good resistance to burning when held in a gas flame.

*Example 17*

A THPC-urea-melamine precondensate was prepared by refluxing a mixture of 3150 parts THPC, 500 parts urea, 125 parts melamine and 4000 parts water for 1 hr. and then cooling rapidly. To this precondensate was added 1 part anhydrous sodium bicarbonate and 4.2 parts ammonium sulphite monohydrate per 100 parts precondensate. A sample of Whatman filter paper No. 20 was impregnated with this solution and squeezed to retain 200 parts of solution per 100 parts dry paper. The impregnated sample was dried at 90° C. for 10 minutes and then immersed in a solution containing 10 parts ammonium carbamate in 90 parts cold water for 10 minutes. The paper was removed from this solution and without rinsing, immersed in a solution containing 6 parts commercial 100 volume hydrogen peroxide in 1400 parts cold water for 15 minutes. The paper was removed from the solution, rinsed in hot and cold water and finally dried at 85–95° C. The paper which showed an increase in weight of 32% compared to the original sample had excellent resistance to burning when subjected to a lighted match.

*Example 18*

A THPC-urea precondensate was prepared exactly as described in Example 1 of U.S. Patent No. 2,983,623. To this precondensate was added 6 parts anhydrous sodium bicarbonate and 4.2 parts ammonium sulphite monohydrate per 100 parts precondensate with continuous stirring. A scoured and bleached 6 oz. per square yard cotton drill fabric was impregnated with this solution in a laboratory padding mangle and squeezed to retain 80 parts solution per 100 parts of dry fabric. The impregnated fabric was dried at 85–95° C. and then placed in pressure vessel containing 1 part ammonia liquor (S.G. 0.880) in 1 part cold water. The pressure in the vessel was raised to 15 p.s.i. by the application of heat and the fabric was treated under these conditions for 15 minutes. The fabric was removed from the vessel, and without rinsing, washed, dried and rinsed as described in Example 1. The dried fabric which showed an increase in weight of 22% compared to the original fabric had excellent resistance to burning when tested by a vertical strip flame test such as described in B.S.S. 3119, 1959. This property was not impaired after subjecting the fabric to 5 successive 1 hr. boiling washes in a solution of 2.5 parts soap and 2.5 parts anhydrous sodium carbonate in 1000 parts water.

*Example 19*

A THPC-urea precondensate was prepared exactly as described in Example 1 of U.S. Patent No. 2,983,623. To this precondensate was added 6 parts ammonium tartrate and 4 parts anhydrous sodium sulphite with continuous stirring. A scoured and bleached 6 oz. per square yard cotton drill fabric was impregnated with this solution to a wet pick-up of 70–80 parts solution per 100 parts dry fabric. The impregnated fabric was dried at 85–95° C. for ten minutes and then treated in a solution of 10 parts ammonium carbonate in 90 parts cold water for 15 minutes. The fabric was removed from this solution and without rinsing, washed, dried and rinsed as described in Example 1 of U.S. No. 2,983,623. The dried fabric which showed an increase in weight of 17.8% compared to the original fabric had excellent resistance to burning when tested by the method described under B.S.S. 3119, 1959. This flame resistant property was not impaired after subjecting the treated fabric to five successive 1 hr. boiling washes in a solution of 2.5 parts soap and 2.5 parts anhydrous sodium carbonate per 1000 parts water.

*Example 20*

A THPC-urea precondensate was prepared exactly as described in Example 1 of U.S. Patent No. 2,983,623. To this precondensate was added 4 parts of ammonium formate and 4 parts of anhydrous sodium sulphite per 100 parts precondensate with continuous stirring. A scoured and bleached 6 oz. per square yard cotton drill fabric was impregnated with this solution in a laboratory padding mangle to a wet pick-up of 70–80 parts of solution per 100 parts dry fabric. The impregnated fabric was dried at 85–95° C. for 10 minutes and then treated in a solution of 10 parts ammonia (S.G. 0.88) in 60 parts cold water for 15 minutes. The fabric was removed from this solution and without rinsing, washed, dried and rinsed as described in Example 1 of U.S. No. 2,983,623. The dried fabric which showed an increase in weight of 19.8% due to the treatment had excellent resistance to burning when tested by the method described under B.S.S. 3119, 1959. The flame resistant property was not impaired after subjecting the treated fabric to five successive 1 hr. boiling washes in a solution of 2.5 parts soap and 2.5 parts anhydrous sodium carbonate per 1000 parts water.

*Example 21*

A THPC precondensate was prepared exactly as described in Example 1 of U.S. Patent No. 2,983,623. To this precondensate was added 1 part of anhydrous sodium bicarbonate and 8 parts of ammonium sulphite monohydrate per 100 parts precondensate with continuous stirring. Part of this solution was poured onto a glass sheet to form a thin layer of solution. The whole sheet was then heated at 95° C. for 10 minutes and then immersed in a solution containing 10 parts ammonium carbonate in 90 parts cold water for 10 minutes. The resin thus formed was then immersed in a solution containing 6 parts 100 volume hydrogen peroxide in 1400 parts cold water for 100 minutes and then finally rinsed in cold water. The resin had excellent flame resistant properties and was insoluble in water.

What is claimed is:

1. A process for increasing the extent of polymerisation and insolubility of a further-polymerisable methylolphosphorus polymeric material containing at least one free methylol group attached to a phosphorus atom, which comprises heating a solution of said polymeric material and a member selected from the group consisting of diammonium sulphite and mixtures of an ammonium salt of a weak acid together with a sulphite, and treating the resulting product with an aqueous ammonia system.

2. A process for increasing the extent of polymerisation and insolubility of a further-polymerisable methylolphosphorus polymeric material containing at least one free methylol group attached to a phosphorus atom which comprises heating a solution of said polymeric material and a member selected from the group consisting of diammonium sulphite and mixtures of an ammonium salt of a weak acid together with sulphite, and steaming the resulting product in the presence of ammonia gas.

3. A process for increasing the extent of polymerisation and insolubility of a further-polymerisable methylol-phosphorus polymeric material containing at least one free methylol group attached to a phosphorus atom which comprises heating at a temperature of from 85 to 120° C. a solution of said polymeric material and a member selected from the group consisting of diammonium sulphite and mixtures of an ammonium salt of a weak acid together with a sulphite, and treating the resulting product with an aqueous ammonia system.

4. A process for modifying the properties of a cellulosic material which comprises impregnating said cellulosic material with a solution of a further-polymerisable methylol-phosphorus polymeric material containing at least one free methylol group attached to a phosphorus atom, said solution containing a member selected from the group consisting of diammonium sulphite and mixtures of an ammonium salt of a weak acid together with a sulphite, drying the resulting impregnated cellulosic material and finally treating said material with an aqueous ammonia system.

5. A process according to claim 4 in which the treatment with an aqueous ammonia system consists in steaming said material in the presence of ammonia gas.

6. A process according to claim 4 in which the treatment with an aqueous ammonia system consists of treating said material with an aqueous ammonium carbonate solution.

7. A process according to claim 4 in which the treatment with an aqueous ammonia system consists of treating said material with an aqueous ammonium carbamate solution.

8. A process according to claim 4 in which the cellulosic material is dried at a temperature of from 85–120° C. after said impregnation step.

9. A process according to claim 4 in which said solution of a further-polymerisable methylol-phosphorus polymeric material containing at least one free methylol group attached to a phosphorus atom containing a member selected from the group consisting of diammonium sulphite and mixtures of an ammonium salt of a weak acid together with a sulphite which additionally contains a buffer compound.

10. A process for modifying the properties of a cellulosic material which comprises impregnating said cellulosic material with an aqueous solution of a further-polymerisable methylol-phosphorus polymeric material which is prepared from tetrakis hydroxy-methyl phosphonium chloride and urea and which contains at least one free methylol group attached to a phosphorus atom, said solution containing diammonium sulphite and a buffer compound, drying the resulting impregnated cellulosic material at a temperature of from 85 to 120° C. and finally treating said material with an aqueous ammonia system.

11. A process for modifying the properties of a cellulosic material which comprises impregnating and cellulosic material with an aqueous solution of a further-polymerisable methylol-phosphorus polymeric material which is prepared from tetrakis hydroxy-methyl phosphonium chloride and urea and which contains at least one free methylol group attached to a phosphorus atom, said solution containing an ammonium salt of a weak acid together with a sulphite and a buffer compound, drying the resulting impregnated cellulosic material at a temperature of from 85 to 120° C. and finally treating said material with an aqueous ammonia system.

12. A process for modifying the properties of a cellulosic material which comprises impregnating said cellulosic material with an aqueous solution of a further-polymerisable methylol-phosphorus polymeric material which is prepared from tetrakis hydroxy-methyl phosphonium chloride and urea and which contains at least one free methylol group attached to a phosphorus atom, said solution containing a member selected from the group consisting of diammonium sulphite and mixtures of an ammonium salt of a weak acid together with a sulphite and said solution containing a buffer compound, drying the resulting impregnated cellulosic material, treating said material with an aqueous ammonia system and finally drying the resulting material.

13. A process for modifying the properties of a cellulosic material which comprises impregnating said cellulosic material with an aqueous solution of a further-polymerisable methylol-phosphorus polymeric material which is prepared from tetrakis hydroxy-methyl phosphonium chloride, urea and melamine and which contains at least one free methylol group attached to a phosphorus atom, said solution containing diammonium sulphite and a buffer compound, drying the resulting impregnated cellulosic material at a temperature of from 85 to 120° C. and finally treating said material with an aqueous ammonia system.

14. A process for modifying the properties of a cellulosic material which comprises impregnating said cellulosic material with an aqueous solution of a further-polymerisable methylol-phosphorus polymeric material which is prepared from tetrakis hydroxy-methyl phosphonium chloride, urea and melamine and which contains at least one free methylol group attached to a phosphorus atom, said solution containing an ammonium salt of a weak acid together with a sulphite and a buffer compound, drying the resulting impregnated cellulosic material at a temperature of from 85 to 120° C. and finally treating said material with an aqueous ammonia system.

15. A process for modifying the properties of a cellulosic material which comprises impregnating said cellulosic material with an aqueous solution of a further-polymerisable methylol-phosphorus polymeric material which is prepared from tetrakis hydroxy-methyl phosphonium chloride, urea and melamine and which contains at least one free methylol group attached to a phosphorus atom, said solution containing a member selected from the group consisting of diammonium sulphite and mixtures of an ammonium salt of a weak acid together with a sulphite and said solution containing a buffer compound, drying the resulting impregnated cellulosic material, treating said material with an aqueous ammonia system and finally drying the resulting material.

References Cited in the file of this patent
UNITED STATES PATENTS

| 2,772,188 | Reeves et al. | Nov. 27, 1956 |
| 2,978,359 | Wedell | Apr. 4, 1961 |
| 2,983,623 | Coates | May 9, 1961 |